United States Patent [19]
Kimura

[11] Patent Number: 4,501,474
[45] Date of Patent: Feb. 26, 1985

[54] MICROSCOPE OBJECTIVE

[75] Inventor: Tadashi Kimura, Tokyo, Japan

[73] Assignee: Olympus Optical Co., Ltd., Tokyo, Japan

[21] Appl. No.: 490,509

[22] Filed: May 2, 1983

[30] Foreign Application Priority Data

May 4, 1982 [JP] Japan .................. 57-73374

[51] Int. Cl.³ .................. G02B 9/60; G02B 21/02
[52] U.S. Cl. .................. 350/414; 350/465
[58] Field of Search .................. 350/414, 465

[56] References Cited

U.S. PATENT DOCUMENTS 4,027,951 6/1977 Mori et al. .................. 350/414

FOREIGN PATENT DOCUMENTS 51-46963 4/1976 Japan .

Primary Examiner—John K. Corbin
Assistant Examiner—Rebecca D. Gass
Attorney, Agent, or Firm—Cushman, Darby & Cushman

[57] ABSTRACT

A microscope objective comprising a first, second, third, fourth and fifth lens components wherein the first lens component is a positive meniscus lens or biconvex lens, the second lens component is a negative lens, the third lens component is a cemented doublet, the fourth lens component is a cemented doublet, and the fifth lens component is a positive cemented doublet, the microscope objective having an extremely low magnification, being arranged to be parfocal with microscope objectives with high magnifications, and having aberrations corrected favorably.

17 Claims, 11 Drawing Figures

MICROSCOPE OBJECTIVE

BACKGROUND OF THE INVENTION (a) Field of the Invention

The present invention relates to a microscope objective and, more particularly, to an anchromat-class microscope objective with the magnification about 2.5×.

(b) Description of the Prior Art

Generally, known microscope objectives can be classified into the following two types, i.e., the limited distance type and infinite distance type. The limited distance type microscope objective is designed so that the image of the object is formed by the objective itself. The infinite distance type microscope objective is designed so that the rays, which come from the object and enter the objective, go out as parallel rays and is arranged that said parallel rays are imaged as an image of the object by means of an imaging lens arranged in rear of the objective. In either type of microscope objectives, there is almost no known microscope objective which is designed for a low magnfication about 2.5×. Especially, it may be said that there is no known microscope objective which is designed for a low magnification about 2.5× and, at the same time, which is parfocal with microscope objectives with other magnifications. For example, the objective disclosed in Japanese published unexamined patent application No. 46963/76 is designed for the magnification of 1× and 2×. However, for said objective, the quality of image such as flatness of image is guaranteed only for the range of height of image up to 9 mm and, therefore, the quality of image assured by said objective is incomparably worse than that of the microscope objective according to the present invention for which the quality of image is guaranteed for a wide field range, i.e., the height of image of 13 mm or more.

SUMMARY OF THE INVENTION

It is, therefore, a primary object of the present invention to provide an achromat-class microscope objective of infinite distance type with the magnification about 2.5× which has large N.A., i.e., 0.07, and which enables to obtain an image with extremely favourable flatness of image over a wide field range.

The microscope objective according to the present invention comprises a first, second, third, fourth and fifth lens components in the order from the object side as shown in FIG. 1, said first lens component comprising a positive lens $L_1$ which is arranged as a meniscus lens convex toward the object side or as a biconvex lens, said second lens component comprising a negative lens $L_2$, said third lens component comprising a positive or negative cemented doublet which consists of a positive lens $L_3$ and a negative lens $L_4$, said fourth lens component comprising a positive or negative cemented doublet which consists of a positive lens $L_5$ and a negative lens $L_6$, said fifth lens component comprising a positive cemented doublet which consists of a negative lens $L_7$ and a positive lens $L_8$, the microscope objective according to the present invention being further arranged to fulfill the following conditions:

$$0.25f < D < 0.35f \quad (1)$$

$$1.56 < \frac{n_1 + n_2}{2} \quad (2)$$

$$40 < \frac{\nu_1 + \nu_2}{2} \quad (3)$$

$$40 < \nu_5 - \nu_6 \quad (4)$$

wherein reference symbol f represents the focal length of the lens system as a whole, reference symbol D represents the distance from the surface on the image side of the first lens component to the surface on the object side of the third lens component, reference symbols $n_1$ and $n_2$ respectively represent refractive indices of the first lens component $L_1$ and the second lens component $L_2$, reference symbols $\nu_1$ and $\nu_2$ respectively represent Abbe's numbers of the first lens component $L_1$ and the second lens component $L_2$, and reference symbols $\nu_5$ and $\nu_6$ respectively represent Abbe's numbers of the positive lens $L_5$ and negative lens $L_6$ which constitute the fourth lens component.

As a microscope objective of infinite distance type is used in combination with an imaging lens, the rearmost lens component therein is always arranged to have positive refractive power. Besides, the quality of image is determined by combining the objective with an imaging lens. Therefore, when designing the objective, it is necessary to correct aberrations of the objective by always taking the imaging lens into consideration, for example, the objective should be designed so that it causes adequate aberrations in order to cancel aberrations to be caused by the imaging lens.

The condition (1) is to decide the basic composition of the objective according to the present invention and is established in order to obtain a uniform image over a wide field by keeping the working distance sufficiently long. If, in the condition (1), the value of D becomes larger than the upper limit thereof, rays in the marginal portion of the field cannot be satisfactorily led to the image surface and, consequently, the intensity of light in the marginal portion becomes insufficient. When it is attempted to prevent the above, the overall length of the objective becomes long and it becomes difficult to make the objective parfocal with objectives with high magnifications. If the value of D becomes smaller than the lower limit of the condition (1), curvature of field becomes unfavourable. When it is tried to correct curvature of field by means of bending of respective lens surfaces, it becomes impossible to ensure a sufficiently long working distance. When it is attempted to make the working distance long here, it becomes impossible to satisfactorily lead the rays in the marginal portion of the field to the image surface and, therefore, the intensity of light in the marginal portion becomes insufficient.

The condition (2) is established in order to correct curvature of field and distortion. If the value of $(n_1+n_2)/2$ becomes smaller than the lower limit of the condition (2), curvature of field is aggravated and distortion becomes large. When it is tried to correct these aberrations by means of bending of respective lens surfaces, it becomes difficult to correct spherical aberration.

The conditions (3) and (4) are established in order to correct spherical aberration in well balanced state over the whole field, i.e., to well balance chromatic aberration of spherical aberration, lateral chromatic aberration, and chromatic aberration of coma. If, in the condition (3), the value of $(\nu_1+\nu_2)/2$ becomes smaller than the lower limit thereof, lateral chromatic aberration becomes large. If, in the condition (4), the value of $\nu_5 - \nu_6$ becomes smaller than the lower limit thereof, chromatic aberration of spherical aberration and chromatic aberration of coma become large. If the conditions (3) and/or (4) are not fulfilled and it is attempted to correct chromatic aberration, which is thereby aggravated, by means of bending of respective lens surfaces, other aberrations such as spherical aberration and curvature of field will be aggravated.

As described so far, the microscope objective which fulfills the above-mentioned conditions (1) through (4) is such lens system that enables to obtain a favourable image over a wide field, in other words, to attain the object of the present invention. However, when said objective is arranged to further fulfill the conditions (5) through (8) shown below, it is possible to obtain a more favourable objective.

(5) $0.1f < r_1 < 0.5f$
(6) $-0.3f < r_{13} < -0.1f$
(7) $1.6 < n_1$
(8) $15 < \nu_4 - \nu_3$

In the conditions shown in the above, reference symbol $r_1$ represents the radius of curvature of the surface on the object side of the first lens component $L_1$, reference symbol $r_{13}$ represents the radius of curvature of the surface on the image side of the fifth lens component (surface on the image side of the positive lens $L_8$), reference symbol $n_1$ represents the refractive index of the first lens component $L_1$, and reference symbols $\nu_3$ and $\nu_4$ respectively represent Abbe's numbers of the positive lens $L_3$ and negative lens $L_4$ which constitute the third lens component.

The condition (5) is established in order to correct distortion in well balanced state over the whole field. If the radius of curvature $r_1$ of the surface on the object side of the first lens component $L_1$ becomes larger than the upper limit of the condition (5), curvature of field becomes large. When it is tried to correct the above by means of bending of other surfaces, distortion becomes large. If $r_1$ becomes smaller than the lower limit of the condition (5), distortion becomes large.

The condition (6) is established in order to correct spherical aberration, curvature of field, distortion, etc. in well balanced state. If the radius of curvature $r_{13}$ of the surface on the image side of the lens $L_8$ becomes larger than the upper limit of the condition (6), spherical aberration will be undercorrected. When it is tried to correct the above-mentioned spherical aberration by means of bending of other surfaces, curvature of field and coma will be aggravated. If $r_{13}$ becomes smaller than the lower limit of the condition (6), distortion becomes large and, moreover, spherical aberration will be overcorrected. When it is tried to correct these aberrations by means of bending of other surfaces, curvature of field and coma will be aggravated.

The condition (7) is established in order to correct curvature of field and distortion in well balanced state. If the refractive index $n_1$ of the first lens component becomes smaller than the lower limit of the condition (7), curvature of field will be aggravated. When it is tried to correct it by means of bending of respective surfaces, distortion becomes large.

The condition (8) is established in order to correct lateral chromatic aberration favourably and, at the same time, to correct chromatic aberration of spherical aberration and chromatic aberration of coma in well balanced state. If the value of $\nu_4 - \nu_3$ becomes smaller than the lower limit of the condition (8), it becomes difficult to correct lateral chromatic aberration or balance between chromatic aberration of spherical aberration and chromatic aberration of coma becomes unfavourable when it is tried to correct lateral chromatic aberration favourably.

When the microscope objective according to the present invention is arranged to further fulfill the conditions (9) through (11) shown below in addition to the above-mentioned conditions, it is possible to obtain a microscope objective which assures still more favourable quality of image.

(9) $0 < r_7 < 0.3f$
(10) $-0.2f < r_{10} < -0.1f$
(11) $10 < \nu_8 - \nu_7$

In the conditions shown in the above, reference symbol $r_7$ represents the radius of curvature of the surface on the image side of the third lens component (surface on the image side of the negative lens $L_4$), reference symbol $r_{10}$ represents the radius of curvature of the surface on the image side of the fourth lens component (surface on the image side of the negative lens $L_6$), and reference symbols $\nu_7$ and $\nu_8$ respectively represent Abbe's numbers of the negative lens $L_7$ and positive lens $L_8$ constituting the fifth lens component.

Out of these conditions, the condition (9) is established in order to correct coma. If the radius of curvature $r_7$ of the surface on the image side of the negative lens $L_4$ becomes larger than the upper limit of the condition (9), spherical aberration will be undercorrected and symmetry of coma will become unfavourable. If $r_7$ becomes smaller than the lower limit of the condition (9), spherical aberration will be overcorrected and symmetry of coma will become unfavourable. When it is tried to correct the above-mentioned aberrations by means of bending of other surfaces, curvature of field will become unfavourable and distortion will become large.

The condition (10) is established in order to correct spherical aberration, curvature of field and coma in well balanced state. When the radius of curvature $r_{10}$ of the surface on the image side of the negative lens $L_6$ becomes larger than the upper limit of the condition (10), i.e., $-0.1f$, spherical aberration will be undercorrected. When it is tried to correct this aberration by means of bending of other surfaces, symmetry of coma will become unfavourable. If $r_{10}$ becomes smaller than the lower limit of the condition (10), i.e., $-0.2f$, distortion will become large and spherical aberration will be obercorrected. When it is tried to correct them by means of bending of other surfaces, curvature of field will become unfavourable and symmetry of coma will also become unfavourable.

The condition (11) is established in order to correct chromatic aberration of spherical aberration and lateral chromatic aberration. If the value of $\nu_8 - \nu_7$ becomes smaller than the lower limit of the condition (11), it is impossible to correct the above-mentioned chromatic aberrations in well balanced state. When it is tried to correct chromatic aberration of spherical aberration by means of bending of respective surfaces, lateral chromatic aberratopm will curve largely and this is not preferable.

DETAILED DESCRIPTION OF THE PREFERRED EMBODIMENTS

Figure 1:
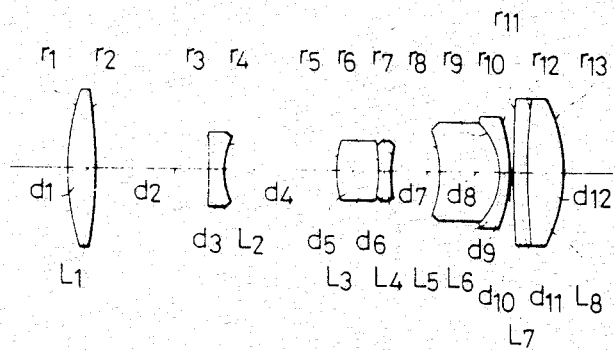
FIG. 1 shows a sectional view of the microscope objective according to the present invention.

Now, preferred embodiments of the microscope objective according to the present invention described so far are shown below.

Embodiment 1

$r_1 = 0.1876$
$d_1 = 0.0284$, $n_1 = 1.741$, $\nu_1 = 52.68$
$r_2 = -0.5497$
$d_2 = 0.1216$
$r_3 = -0.0973$
$d_3 = 0.0146$, $n_2 = 1.7865$, $\nu_2 = 50.00$
$r_4 = 0.0808$
$d_4 = 0.1300$
$r_5 = 0.1624$
$d_5 = 0.0383$, $n_3 = 1.64769$, $\nu_3 = 33.8$
$r_6 = -0.1657$
$d_6 = 0.0122$, $n_4 = 1.6425$, $\nu_4 = 58.37$
$r_7 = 0.2241$
$d_7 = 0.0460$
$r_8 = -0.4352$
$d_8 = 0.0598$, $n_5 = 1.497$, $\nu_5 = 81.61$
$r_9 = -0.0856$
$d_9 = 0.0122$, $n_6 = 1.74$, $\nu_6 = 31.7$
$r_{10} = -0.1527$
$d_{10} = 0.0024$
$r_{11} = -1.1413$
$d_{11} = 0.0146$, $n_7 = 1.7859$, $\nu_7 = 44.18$
$r_{12} = 1.1413$
$d_{12} = 0.0390$, $n_8 = 1.497$, $\nu_8 = 81.61$
$r_{13} = -0.2140$
$F = 1$, $D = 0.3032$
$\beta = 2.5X$, $(n_1 + n_2)/2 = 1.76375$
$NA = 0.07$, $\nu_5 - \nu_6 = 49.91$
$f_F = 0.337$, $\nu_8 - \nu_7 = 37.43$
$f_B = -1.046$, $(\nu_1 + \nu_2)/2 = 51.34$
$f = 0.878$, $\nu_4 - \nu_3 = 24.57$

Embodiment 2

$r_1 = 0.1658$
$d_1 = 0.0294$, $n_1 = 1.6223$, $\nu_1 = 53.2$
$r_2 = -0.5720$
$d_2 = 0.1227$
$r_3 = -0.1644$
$d_3 = 0.0154$, $n_2 = 1.53375$, $\nu_2 = 55.52$
$r_4 = 0.0815$
$d_4 = 0.1286$
$r_5 = 0.1305$
$d_5 = 0.0386$, $n_3 = 1.6398$, $\nu_3 = 34.48$
$r_6 = -0.1366$
$d_6 = 0.0122$, $n_4 = 1.713$, $\nu_4 = 53.84$
$r_7 = 0.1627$
$d_7 = 0.0465$
$r_8 = -0.1583$
$d_8 = 0.0603$, $n_5 = 1.497$, $\nu_5 = 81.61$
$r_9 = -0.0780$
$d_9 = 0.0122$, $n_6 = 1.74$, $\nu_6 = 31.7$
$r_{10} = -0.1338$
$d_{10} = 0.0024$
$r_{11} = -5.3797$
$d_{11} = 0.0146$, $n_7 = 1.56444$, $\nu_7 = 43.78$
$r_{12} = 0.8237$
$d_{12} = 0.0365$, $n_8 = 1.497$, $\nu_8 = 81.61$
$r_{13} = -0.1933$
$F = 1$, $D = 0.3038$
$\beta = 2.5X$, $(n_1 + n_2)/2 = 1.57803$
$NA = 0.07$, $\nu_5 - \nu_6 = 49.91$
$f_F = 0.337$, $\nu_8 - \nu_7 = 37.83$
$f_B = -1.047$, $(\nu_1 + \nu_2)/2 = 54.36$
$f = 0.878$, $\nu_4 - \nu_3 = 19.36$

Embodiment 3

$r_1 = 0.1601$
$d_1 = 0.0305$, $n_1 = 1.641$, $\nu_1 = 56.93$
$r_2 = -0.8200$
$d_2 = 0.1226$
$r_3 = -0.1504$
$d_3 = 0.0163$, $n_2 = 1.52682$, $\nu_2 = 51.12$
$r_4 = 0.0845$
$d_4 = 0.1277$
$r_5 = 0.1111$
$d_5 = 0.0389$, $n_3 = 1.5927$, $\nu_3 = 35.29$
$r_6 = -0.1086$
$d_6 = 0.0122$, $n_4 = 1.713$, $\nu_4 = 53.84$
$r_7 = 0.1609$
$d_7 = 0.0464$
$r_8 = -0.1401$
$d_8 = 0.0605$, $n_5 = 1.497$, $\nu_5 = 81.61$
$r_9 = -0.0746$
$d_9 = 0.0122$, $n_6 = 1.74$, $\nu_6 = 31.7$
$r_{10} = -0.1206$
$d_{10} = 0.0024$
$r_{11} = 1.2481$
$d_{11} = 0.0146$, $n_7 = 1.54814$, $\nu_7 = 45.78$
$r_{12} = 0.3134$
$d_{12} = 0.0366$, $n_8 = 1.497$, $\nu_8 = 81.61$
$r_{13} = -0.2471$
$F = 1$, $D = 0.3039$
$\beta = 2.5X$, $(n_1 + n_2)/2 = 1.58391$
$NA = 0.07$, $\nu_5 - \nu_6 = 49.91$
$f_F = 0.337$, $\nu_8 - \nu_7 = 35.83$
$f_B = -1.046$, $(\nu_1 + \nu_2)/2 = 54.03$
$f = 0.878$, $\nu_4 - \nu_3 = 18.55$

Embodiment 4

$r_1 = 0.3830$
$d_1 = 0.0319$, $n_1 = 1.762$, $\nu_1 = 40.1$
$r_2 = -0.4113$
$d_2 = 0.0478$
$r_3 = 0.1995$
$d_3 = 0.0188$, $n_2 = 1.51118$, $\nu_2 = 51.02$
$r_4 = 0.1192$
$d_4 = 0.2005$
$r_5 = 0.4993$
$d_5 = 0.0419$, $n_3 = 1.5927$, $\nu_3 = 35.29$
$r_6 = -0.0558$
$d_6 = 0.0122$, $n_4 = 1.6583$, $\nu_4 = 57.33$
$r_7 = 0.0970$
$d_7 = 0.0319$
$r_8 = -0.0827$
$d_8 = 0.0646$, $n_5 = 1.497$, $\nu_5 = 81.61$
$r_9 = -0.0672$
$d_9 = 0.0122$, $n_6 = 1.74$, $\nu_6 = 31.7$
$r_{10} = -0.1041$
$d_{10} = 0.0024$
$r_{11} = 3.1426$
$d_{11} = 0.0146$, $n_7 = 1.697$, $\nu_7 = 48.51$
$r_{12} = 0.4139$
$d_{12} = 0.0476$, $n_8 = 1.497$, $\nu_8 = 81.61$
$r_{13} = -0.1355$
$F = 1$, $D = 0.3044$
$\beta = 2.5X$, $(n_1 + n_2)/2 = 1.63659$
$NA = 0.07$, $\nu_5 - \nu_6 = 49.91$
$f = 0.336$, $\nu_8 - \nu_7 = 33.1$
$f = -1.044$, $(\nu_1 + \nu_2)/2 = 45.56$
$f = 0.878$, $\nu_4 - \nu_3 = 22.04$

Embodiment 5

| | | |
|---|---|---|
| $r_1 = 0.1126$ | | |
| $d_1 = 0.0330$ | $n_1 = 1.6223$ | $\nu_1 = 53.2$ |
| $r_2 = 0.6299$ | | |
| $d_2 = 0.1282$ | | |
| $r_3 = -0.0607$ | | |
| $d_3 = 0.0243$ | $n_2 = 1.61772$ | $\nu_2 = 49.83$ |
| $r_4 = 2.3358$ | | |
| $d_4 = 0.1087$ | | |
| $r_5 = 0.1468$ | | |
| $d_5 = 0.0579$ | $n_3 = 1.5927$ | $\nu_3 = 35.29$ |
| $r_6 = -0.0816$ | | |
| $d_6 = 0.0122$ | $n_4 = 1.6583$ | $\nu_4 = 57.33$ |
| $r_7 = 0.1856$ | | |
| $d_7 = 0.0298$ | | |
| $r_8 = -0.1819$ | | |
| $d_8 = 0.0476$ | $n_5 = 1.497$ | $\nu_5 = 81.61$ |
| $r_9 = -0.0777$ | | |
| $d_9 = 0.0122$ | $n_6 = 1.74$ | $\nu_6 = 31.7$ |
| $r_{10} = -0.1384$ | | |
| $d_{10} = 0.0024$ | | |
| $r_{11} = 1.3951$ | | |
| $d_{11} = 0.0146$ | $n_7 = 1.50137$ | $\nu_7 = 56.4$ |
| $r_{12} = 0.1416$ | | |
| $d_{12} = 0.0491$ | $n_8 = 1.497$ | $\nu_8 = 81.61$ |
| $r_{13} = -0.1930$ | | |
| $F = 1$ | | $D = 0.2976$ |
| $\beta = 2.5X$ | | $(n_1 + n_2)/2 = 1.62001$ |
| $NA = 0.07$ | | $\nu_5 - \nu_6 = 49.91$ |
| $f_F = 0.336$ | | $\nu_8 - \nu_7 = 25.21$ |
| $f_B = -1.047$ | | $(\nu_1 + \nu_2)/2 = 51.52$ |
| $f = 0.878$ | | $\nu_4 - \nu_3 = 22.04$ |

Embodiment 6

| | | |
|---|---|---|
| $r_1 = 0.1044$ | | |
| $d_1 = 0.0330$ | $n_1 = 1.6223$ | $\nu_1 = 53.2$ |
| $r_2 = 0.4352$ | | |
| $d_2 = 0.1169$ | | |
| $r_3 = -0.0592$ | | |
| $d_3 = 0.0141$ | $n_2 = 1.61772$ | $\nu_2 = 49.83$ |
| $r_4 = -0.5253$ | | |
| $d_4 = 0.1336$ | | |
| $r_5 = 0.1014$ | | |
| $d_5 = 0.0394$ | $n_3 = 1.5927$ | $\nu_3 = 35.29$ |
| $r_6 = -0.0950$ | | |
| $d_6 = 0.0122$ | $n_4 = 1.713$ | $\nu_4 = 53.84$ |
| $r_7 = 0.1193$ | | |
| $d_7 = 0.0321$ | | |
| $r_8 = -0.1236$ | | |
| $d_8 = 0.0499$ | $n_5 = 1.497$ | $\nu_5 = 81.61$ |
| $r_9 = -0.0700$ | | |
| $d_9 = 0.0122$ | $n_6 = 1.74$ | $\nu_6 = 31.7$ |
| $r_{10} = -0.1166$ | | |
| $d_{10} = 0.0024$ | | |
| $r_{11} = 0.7135$ | | |
| $d_{11} = 0.0146$ | $n_7 = 1.50137$ | $\nu_7 = 56.4$ |
| $r_{12} = 0.1212$ | | |
| $d_{12} = 0.0596$ | $n_8 = 1.497$ | $\nu_8 = 81.61$ |
| $r_{13} = -0.2109$ | | |
| $F = 1$ | | $D = 0.3015$ |
| $\beta = 2.5X$ | | $(n_1 + n_2)/2 = 1.62001$ |
| $NA = 0.07$ | | $\nu_5 - \nu_6 = 49.91$ |
| $f_F = 0.337$ | | $\nu_8 - \nu_7 = 25.21$ |
| $f_B = -1.039$ | | $(\nu_1 + \nu_2)/2 = 51.52$ |
| $f = 0.878$ | | $\nu_4 - \nu_3 = 18.55$ |

Embodiment 7

| | | |
|---|---|---|
| $r_1 = 0.1398$ | | |
| $d_1 = 0.0329$ | $n_1 = 1.755$ | $\nu_1 = 52.33$ |
| $r_2 = 0.1483$ | | |
| $d_2 = 0.1838$ | | |
| $r_3 = -0.0660$ | | |
| $d_3 = 0.0136$ | $n_2 = 1.55963$ | $\nu_2 = 61.17$ |
| $r_4 = -0.2909$ | | |
| $d_4 = 0.0515$ | | |
| $r_5 = 0.3101$ | | |
| $d_5 = 0.0374$ | $n_3 = 1.5927$ | $\nu_3 = 35.29$ |
| $r_6 = -0.0483$ | | |
| $d_6 = 0.0116$ | $n_4 = 1.55963$ | $\nu_4 = 61.17$ |
| $r_7 = 0.1410$ | | |
| $d_7 = 0.0208$ | | |
| $r_8 = -0.0984$ | | |
| $d_8 = 0.0401$ | $n_5 = 1.497$ | $\nu_5 = 81.61$ |
| $r_9 = -0.0531$ | | |
| $d_9 = 0.0116$ | $n_6 = 1.74$ | $\nu_6 = 31.7$ |
| $r_{10} = -0.0981$ | | |
| $d_{10} = 0.0023$ | | |
| $r_{11} = 6.2293$ | | |
| $d_{11} = 0.0140$ | $n_7 = 1.50048$ | $\nu_7 = 65.99$ |
| $r_{12} = 0.1040$ | | |
| $d_{12} = 0.0742$ | $n_8 = 1.497$ | $\nu_8 = 81.61$ |
| $r_{13} = -0.1397$ | | |
| $F = 1$ | | $D = 0.2974$ |
| $\beta = 2.5X$ | | $(n_1 + n_2)/2 = 1.65732$ |
| $NA = 0.07$ | | $\nu_5 - \nu_6 = 49.91$ |
| $f_F = 0.340$ | | $\nu_8 - \nu_7 = 15.62$ |
| $f_B = -1.114$ | | $(\nu_1 + \nu_2)/2 = 56.75$ |
| $f = 0.837$ | | $\nu_4 - \nu_3 = 25.88$ |

Embodiment 8

| | | |
|---|---|---|
| $r_1 = 0.1393$ | | |
| $d_1 = 0.0329$ | $n_1 = 1.741$ | $\nu_1 = 52.68$ |
| $r_2 = 0.4461$ | | |
| $d_2 = 0.1768$ | | |
| $r_3 = -0.0699$ | | |
| $d_3 = 0.0118$ | $n_2 = 1.6583$ | $\nu_2 = 57.33$ |
| $r_4 = -0.2204$ | | |
| $d_4 = 0.0546$ | | |
| $r_5 = 0.2189$ | | |
| $d_5 = 0.0480$ | $n_3 = 1.5927$ | $\nu_3 = 35.29$ |
| $r_6 = -0.535$ | | |
| $d_6 = 0.0116$ | $n_4 = 1.55963$ | $\nu_4 = 61.17$ |
| $r_7 = 0.1147$ | | |
| $d_7 = 0.0204$ | | |
| $r_8 = -0.0848$ | | |
| $d_8 = 0.0408$ | $n_5 = 1.497$ | $\nu_5 = 81.61$ |
| $r_9 = -0.0522$ | | |
| $d_9 = 0.0116$ | $n_6 = 1.74$ | $\nu_6 = 31.7$ |
| $r_{10} = -0.0941$ | | |
| $d_{10} = 0.0023$ | | |
| $r_{11} = 2.7517$ | | |
| $d_{11} = 0.0140$ | $n_7 = 1.50048$ | $\nu_7 = 65.99$ |
| $r_{12} = 0.1053$ | | |
| $d_{12} = 0.0717$ | $n_8 = 1.497$ | $\nu_8 = 81.61$ |
| $r_{13} = -0.1373$ | | |
| $F = 1$ | | $D = 0.2906$ |
| $\beta = 2.5X$ | | $(n_1 + n_2)/2 = 1.69965$ |
| $NA = 0.07$ | | $\nu_5 - \nu_6 = 49.91$ |
| $f_F = 0.340$ | | $\nu_8 - \nu_7 = 15.62$ |
| $f_B = -1.114$ | | $(\nu_1 + \nu_2)/2 = 55.01$ |
| $f = 0.837$ | | $\nu_4 - \nu_3 = 25.88$ |

Embodiment 9

| | | |
|---|---|---|
| $r_1 = 0.1438$ | | |
| $d_1 = 0.0327$ | $n_1 = 1.755$ | $\nu_1 = 52.33$ |
| $r_2 = 0.4311$ | | |
| $d_2 = 0.1791$ | | |
| $r_3 = -0.0783$ | | |
| $d_3 = 0.0120$ | $n_2 = 1.6968$ | $\nu_2 = 56.49$ |
| $r_4 = -0.1877$ | | |
| $d_4 = 0.0571$ | | |
| $r_5 = 0.1454$ | | |
| $d_5 = 0.0479$ | $n_3 = 1.5927$ | $\nu_3 = 35.29$ |
| $r_6 = -0.0561$ | | |
| $d_6 = 0.0116$ | $n_4 = 1.60311$ | $\nu_4 = 60.7$ |
| $r_7 = 0.0862$ | | |
| $d_7 = 0.0211$ | | |
| $r_8 = -0.0834$ | | |
| $d_8 = 0.0453$ | $n_5 = 1.497$ | $\nu_5 = 81.61$ |

-continued

Embodiment 9

| | | |
|---|---|---|
| $r_9 = -0.0524$ | | |
| $d_9 = 0.0116$ | $n_6 = 1.74$ | $\nu_6 = 31.7$ |
| $r_{10} = -0.0943$ | | |
| $d_{10} = 0.0023$ | | |
| $r_{11} = -2.1564$ | | |
| $d_{11} = 0.0140$ | $n_7 = 1.50048$ | $\nu_7 = 65.99$ |
| $r_{12} = 0.1116$ | | |
| $d_{12} = 0.0630$ | $n_8 = 1.497$ | $\nu_8 = 81.61$ |
| $r_{13} = -0.1211$ | | |
| $F = 1$ | | $D = 0.2966$ |
| $\beta = 2.5X$ | | $(n_1 + n_2)/2 = 1.7259$ |
| $NA = 0.07$ | | $\nu_5 - \nu_6 = 49.91$ |
| $f_F = 0.340$ | | $\nu_8 - \nu_7 = 15.62$ |
| $f_B = -1.114$ | | $(\nu_1 + \nu_2)/2 = 54.41$ |
| $f = 0.837$ | | $\nu_4 - \nu_3 = 25.41$ |

In embodiments shown in the above, reference symbols $r_1$ through $r_{13}$ respectively represent radii of curvature of respective lens surfaces, reference symbols $d_1$ through $d_{12}$ respectively represent thicknesses of respective lenses and airspaces between respective lenses, reference symbols $n_1$ through $n_8$ respectively represent refractive indices of respective lenses, reference symbols $\nu_1$ through $\nu_8$ respectively represent Abbe's numbers of respective lenses, reference symbol $\beta$ represents the magnification, reference symbol N.A. represents the numerical aperture, reference symbol $f_F$ represents the front focal point of the lens system as a whole, and reference symbol $f_B$ represents the rear focal point of the lens system as a whole.

Figure 2:
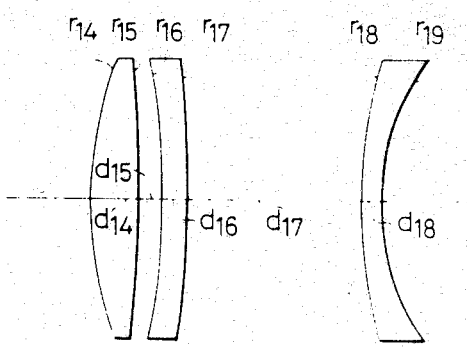
FIG. 2 shows a sectional view of an example of imaging lens to be used in combination with the microscope objective according to the present invention.
Figure 3:
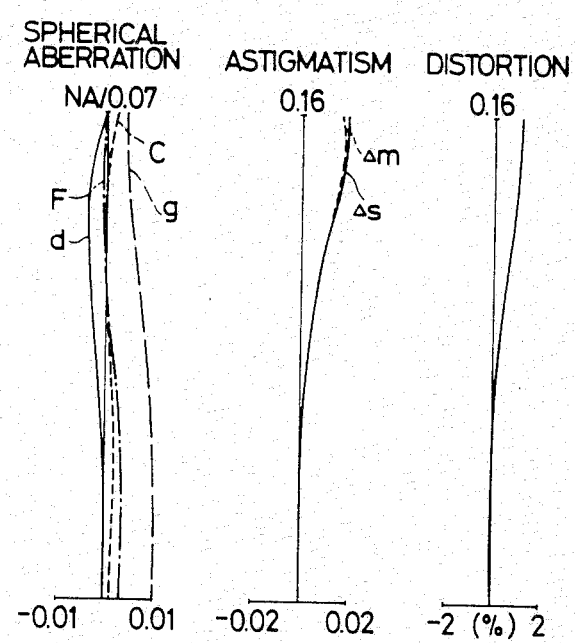
FIGS. 3 through 11 respectively show graphs illustrating aberration curves of Embodiments 1 through 9 of the microscope objective according to the present invention.
Figure 4:
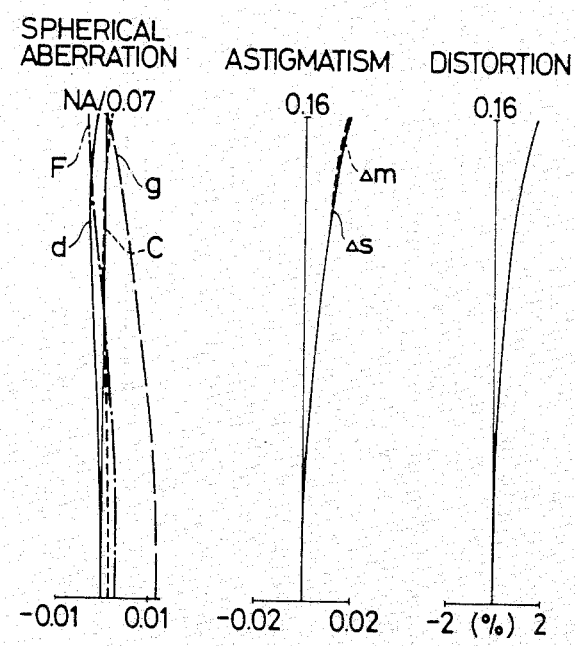
Figure 5:
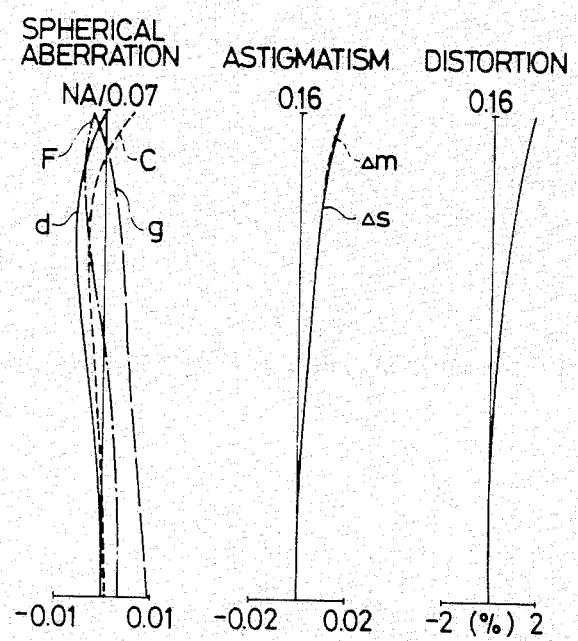
Figure 6:
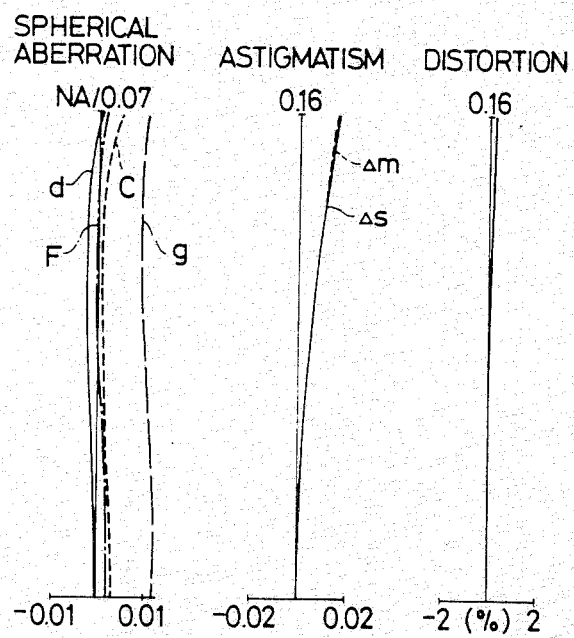
Figure 7:
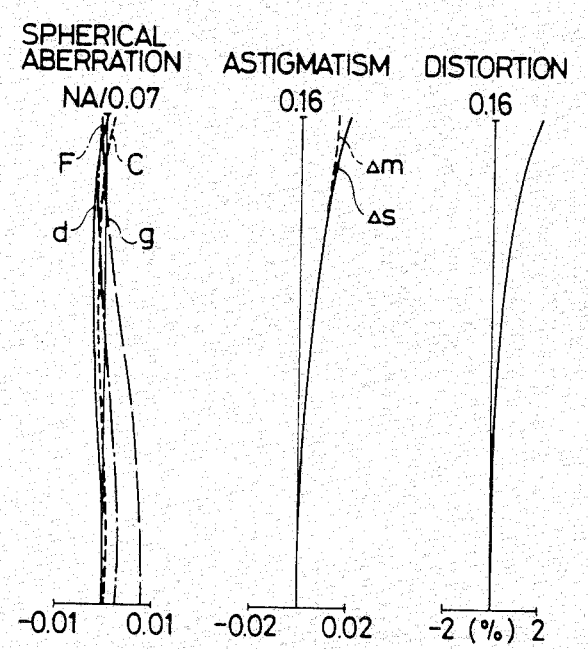
Figure 8:
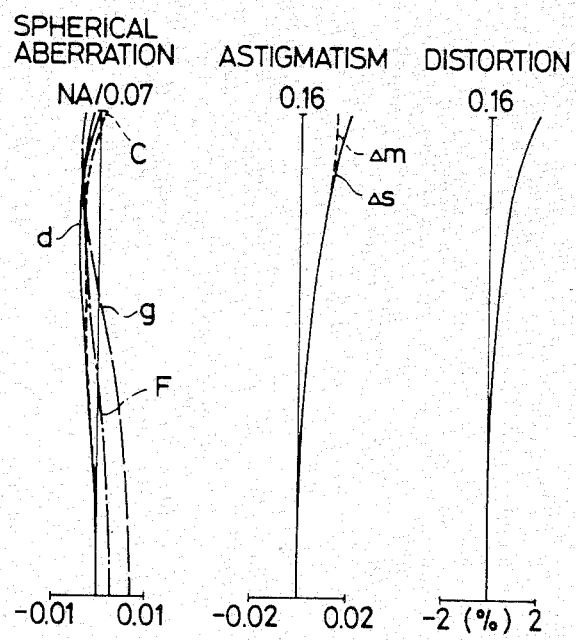
Figure 9:
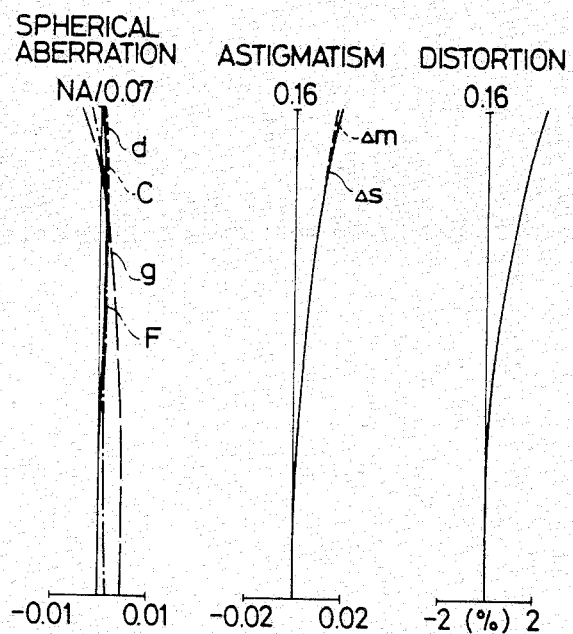
Figure 10:
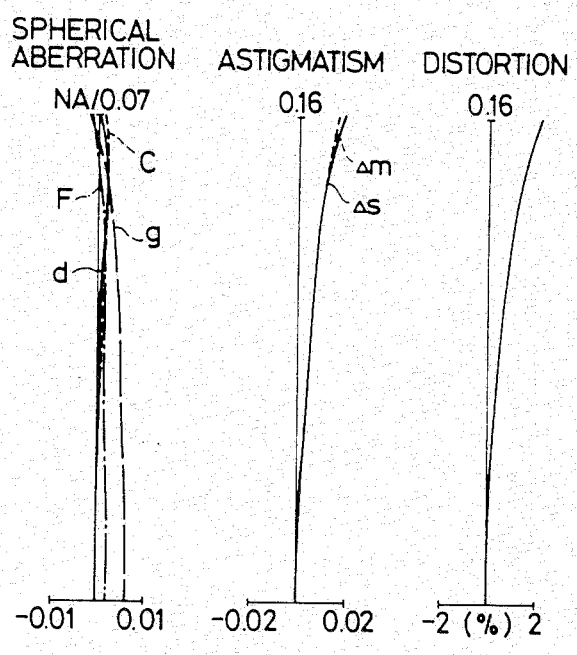
Figure 11:
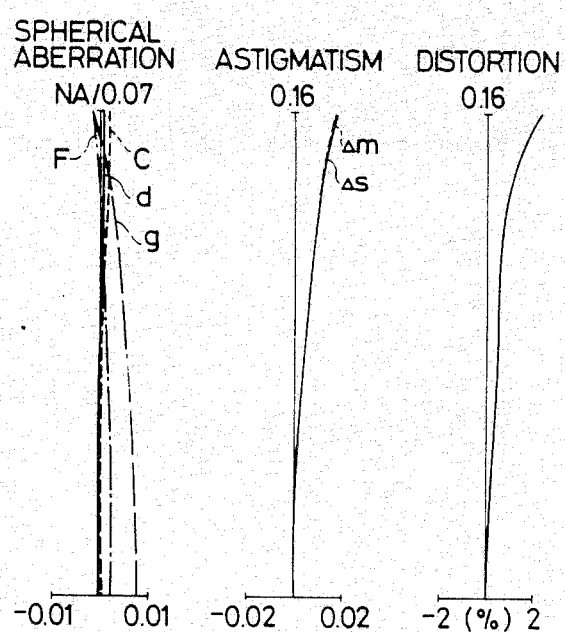

As respective embodiments shown in the above are microscope objectives of infinite distance type, they do not form an image of an object by themselves. Therefore, graphs of aberration curves of respective embodiments shown in FIGS. 3 through 11 represents aberration curves obtained when the lens system according to these embodiments are respectively combined with the imaging lens which has the lens configuration shown in FIG. 2 and numerical data shown below.

| | | |
|---|---|---|
| $r_{14} = 0.3600$ | | |
| $d_{14} = 0.0488$ | $n_9 = 1.48749$ | $\nu_9 = 70.15$ |
| $r_{15} = -1.3748$ | | |
| $d_{15} = 0.0244$ | | |
| $r_{16} = -0.7012$ | | |
| $d_{16} = 0.0244$ | $n_{10} = 1.74$ | $\nu_{10} = 28.29$ |
| $r_{17} = -1.4905$ | | |
| $d_{17} = 0.1829$ | | |
| $r_{18} = 0.5358$ | | |
| $d_{18} = 0.0220$ | $n_{11} = 1.48749$ | $\nu_{11} = 70.15$ |
| $r_{19} = 0.2395$ | | |

The above-mentioned numerical data of the imaging lens show the values when the total focal length F of the microscope objective and imaging lens is regarded as 1.

Out of respective embodiments shown in the above, Embodiments 1 and 3 are respectively arranged that the first lens component is a biconvex lens, the second lens component is a biconcave lens, the third lens component is a cemented doublet having positive refractive power, and the fourth lens component is also a cemented doublet having positive refractive power. Embodiment 2 is arranged that the first lens component is a biconvex lens, the second lens component is a biconcave lens, the third lens component is a cemented doublet having positive refractive power, and the fourth lens component is a cemented doublet having negative refractive power. Embodiment 4 is arranged that the first lens component is a biconvex lens, the second lens component is a negative meniscus lens, and the third and fourth lens components are cemented doublets respectively having negative refractive powers. Embodiment 5 is arranged that the first lens component is a positive meniscus lens, the second lens component is a biconcave lens, the third lens component is a cemented doublet having positive refractive power, and the fourth lens component is a cemented doublet having negative refractive power. Embodiments 6 through 9 are respectively arranged that the first lens component is a positive meniscus lens, the second lens component is a negative meniscus lens, the third lens component is a cemented doublet having negative refractive power, and the fourth lens component is a cemented doublet having negative refractive power.

As explained so far and as it is evident from respective embodiments, the present invention provides a microscope objective with an extremely low magnification which keeps parfocality with microscope objectives with high magnifications and, at the same time, aberrations thereof are favourably corrected over a wide field.

I claim:

1. A microscope objective comprising a first, second, third, fourth and fifth lens components in the order from the object side wherein said first lens component is a positive lens, said second lens component is a negative lens, said third lens component is a cemented doublet consisting of positive lens and a negative lens, said fourth lens component is a cemented doublet consisting of a positive lens and a negative lens, and said fifth lens component is a positive cemented doublet consisting of a negative lens and a positive lens, said microscope objective being arranged to fulfill the conditions (1) through (4) shown below:

$$0.25f < D < 0.35f \quad (1)$$

$$1.56 < \frac{n_1 + n_2}{2} \quad (2)$$

$$40 < \frac{\nu_1 + \nu_2}{2} \quad (3)$$

$$40 < \nu_5 - \nu_6 \quad (4)$$

where, reference symbol f represents the focal length of the lens system as a whole, reference symbol D represents the distance from the surface on the image side of the first lens component to the surface on the object side of the third lens component, reference symbols $n_1$ and $n_2$ respectively represent refractive indices of the first lens component the second lens component, reference symbols $\nu_1$ and $\nu_2$ respectively represent Abbe's numbers of the first lens component and the second lens component, and reference symbols $\nu_5$ and $\nu_6$ respectively represent Abbe's numbers of the positive lens and the negative lens which constitute the fourth lens component.

2. A microscope objective according to claim 1 further fulfilling the conditions (5) through (8) shown below:

(5) $0.1f < r_1 < 0.5f$
(6) $-0.3f < r_{13} < -0.1f$
(7) $1.6 < n_1$
(8) $15 < \nu_4 - \nu_3$ where, reference symbol $r_1$ represents the radius of curvature of the surface on the object side of the first lens component, reference symbol $r_{13}$ represents the radius of curvature of the surface on the image side of the fifth lens component, and reference symbols $\nu_3$ and $\nu_4$ respectively represent Abbe's numbers of the positive lens and the negative lens which constitute the third lens component.

3. A microscope objective according to claim 2 further fulfilling the conditions (9) through (11) shown below:

(9) $0 < r_7 < 0.3f$
(10) $-0.2f < r_{10} < -0.1f$
(11) $10 < \nu_8 - \nu_7$ where, reference symbol $r_7$ represents the radius of curvature of the surface on the image side of the third lens component, reference symbol $r_{10}$ represents the radius of curvature of the surface on the image side of the fourth lens component, and reference symbols $\nu_7$ and $\nu_8$ respectively represent Abbe's numbers of the negative lens and the positive lens which constitute the fifth lens component.

4. A microscope objective according to claim 3 wherein said first lens component is arranged as a biconvex lens, said sicond lens component is arranged as a biconcave lens, said third lens component is arranged as a cemented doublet having positive refractive power, and said fourth lens component is arranged as a cemented doublet having positive refractive power.

5. A microscope objective according to claim 4 wherein said microscope objective has the following numerical data:

| | | |
|---|---|---|
| $r_1 = 0.1876$ | | |
| $d_1 = 0.0284$ | $n_1 = 1.741$ | $\nu_1 = 52.68$ |
| $r_2 = -0.5497$ | | |
| $d_2 = 0.1216$ | | |
| $r_3 = -0.0973$ | | |
| $d_3 = 0.0146$ | $n_2 = 1.7865$ | $\nu_2 = 50.00$ |
| $r_4 = 0.0808$ | | |
| $d_4 = 0.1300$ | | |
| $r_5 = 0.1624$ | | |
| $d_5 = 0.0383$ | $n_3 = 1.64769$ | $\nu_3 = 33.8$ |
| $r_6 = -0.1657$ | | |
| $d_6 = 0.0122$ | $n_4 = 1.6425$ | $\nu_4 = 58.37$ |
| $r_7 = 0.2241$ | | |
| $d_7 = 0.0460$ | | |
| $r_8 = -0.4352$ | | |
| $d_8 = 0.0598$ | $n_5 = 1.497$ | $\nu_5 = 81.61$ |
| $r_9 = -0.0856$ | | |
| $d_9 = 0.0122$ | $n_6 = 1.74$ | $\nu_6 = 31.7$ |
| $r_{10} = -0.1527$ | | |
| $d_{10} = 0.0024$ | | |
| $r_{11} = -1.1413$ | | |
| $d_{11} = 0.0146$ | $n_7 = 1.7859$ | $\nu_7 = 44.18$ |
| $r_{12} = 1.1413$ | | |
| $d_{12} = 0.0390$ | $n_8 = 1.497$ | $\nu_8 = 81.61$ |
| $r_{13} = -0.2140$ | | |
| $F = 1$ | | $D = 0.3032$ |
| $\beta = 2.5X$ | | $(n_1 + n_2)/2 = 1.76375$ |
| $NA = 0.07$ | | $\nu_5 - \nu_6 = 49.91$ |
| $f_F = 0.337$ | | $\nu_8 - \nu_7 = 37.43$ |
| $f_B = -1.046$ | | $(\nu_1 + \nu_2)/2 = 51.34$ |
| $f = 0.878$ | | $\nu_4 - \nu_3 = 24.57$ | where, reference symbols $r_1$ through $r_{13}$ respectively represent radii of curvature of respective lens surfaces, reference symbols $d_1$ through $d_{12}$ respectively represent thicknesses of respective lenses and airspaces between respective lenses, reference symbols $n_1$ through $n_8$ respectively represent refractive indices of respective lenses, reference symbols $\nu_1$ through $\nu_8$ respectively represent Abbe's numbers of respective lenses, reference symbol $\beta$ represents the magnification, reference symbol $f_F$ represents the front focal point of the lens system as a whole, and reference symbol $f_B$ represents the rear focal point of the lens system as a whole.

6. A microscope objective according to claim 4 wherein said microscope objective has the following numerical data:

| | | |
|---|---|---|
| $r_1 = 0.1601$ | | |
| $d_1 = 0.0305$ | $n_1 = 1.641$ | $\nu_1 = 56.93$ |
| $r_2 = -0.8200$ | | |
| $d_2 = 0.1226$ | | |
| $r_3 = -0.1504$ | | |
| $d_3 = 0.0163$ | $n_2 = 1.52682$ | $\nu_2 = 51.12$ |
| $r_4 = 0.0845$ | | |
| $d_4 = 0.1277$ | | |
| $r_5 = 0.1111$ | | |
| $d_5 = 0.0389$ | $n_3 = 1.5927$ | $\nu_3 = 35.29$ |
| $r_6 = -0.1086$ | | |
| $d_6 = 0.0122$ | $n_4 = 1.713$ | $\nu_4 = 53.84$ |
| $r_7 = 0.1609$ | | |
| $d_7 = 0.0464$ | | |
| $r_8 = -0.1401$ | | |
| $d_8 = 0.0605$ | $n_5 = 1.497$ | $\nu_5 = 81.61$ |
| $r_9 = -0.0746$ | | |
| $d_9 = 0.0122$ | $n_6 = 1.74$ | $\nu_6 = 31.7$ |
| $r_{10} = -0.1206$ | | |
| $d_{10} = 0.0024$ | | |
| $r_{11} = 1.2481$ | | |
| $d_{11} = 0.0146$ | $n_7 = 1.54814$ | $\nu_7 = 45.78$ |
| $r_{12} = 0.3134$ | | |
| $d_{12} = 0.0366$ | $n_8 = 1.497$ | $\nu_8 = 81.61$ |
| $r_{13} = -0.2471$ | | |
| $F = 1$ | | $D = 0.3039$ |
| $\beta = 2.5X$ | | $(n_1 + n_2)/2 = 1.58391$ |
| $NA = 0.07$ | | $\nu_5 - \nu_6 = 49.91$ |
| $f_F = 0.337$ | | $\nu_8 - \nu_7 = 35.83$ |
| $f_B = -1.046$ | | $(\nu_1 + \nu_2)/2 = 54.03$ |
| $f = 0.878$ | | $\nu_4 - \nu_3 = 18.55$ | where, reference symbols $r_1$ through $r_{13}$ respectively represent radii of curvature of respective lens surfaces, reference symbols $d_1$ through $d_{12}$ respectively represent thicknesses of respective lenses and airspaces between respective lenses, reference symbols $n_1$ through $n_8$ respectively represent refractive indices of respective lenses, reference symbols $\nu_1$ through $\nu_8$ respectively represent Abbe's numbers of respective lenses, reference symbol $\beta$ represents the magnification, reference symbol $f_F$ represents the front focal point of the lens system as a whole, and reference symbol $f_B$ represents the rear focal point of the lens system as a whole.

7. A microscope objective according to claim 3 wherein said first lens component is arranged as a biconvex lens, said second lens component is arranged as a biconcave lens, said third lens component is arranged as a cemented doublet having positive refractive power, and said fourth lens component is arranged as a cemented doublet having negative refractive power.

8. A microscope objective according to claim 7 wherein said microscope objective has the following numerical data:

| | | |
|---|---|---|
| $r_1 = 0.1658$ | | |
| $d_1 = 0.0294$ | $n_1 = 1.6223$ | $\nu_1 = 53.2$ |
| $r_2 = -0.5720$ | | |
| $d_2 = 0.1227$ | | |
| $r_3 = -0.1644$ | | |
| $d_3 = 0.0154$ | $n_2 = 1.53375$ | $\nu_2 = 55.52$ |
| $r_4 = 0.0815$ | | |
| $d_4 = 0.1286$ | | |
| $r_5 = 0.1305$ | | |
| $d_5 = 0.0386$ | $n_3 = 1.6398$ | $\nu_3 = 34.48$ |
| $r_6 = -0.1366$ | | |

-continued

| | | |
|---|---|---|
| $d_6 = 0.0122$ | $n_4 = 1.713$ | $\nu_4 = 53.84$ |
| $r_7 = 0.1627$ | | |
| $d_7 = 0.0465$ | | |
| $r_8 = -0.1583$ | | |
| $d_8 = 0.0603$ | $n_5 = 1.497$ | $\nu_5 = 81.61$ |
| $r_9 = -0.0780$ | | |
| $d_9 = 0.0122$ | $n_6 = 1.74$ | $\nu_6 = 31.7$ |
| $r_{10} = -0.1338$ | | |
| $d_{10} = 0.0024$ | | |
| $r_{11} = -5.3797$ | | |
| $d_{11} = 0.0146$ | $n_7 = 1.56444$ | $\nu_7 = 43.78$ |
| $r_{12} = 0.8237$ | | |
| $d_{12} = 0.0365$ | $n_8 = 1.497$ | $\nu_8 = 81.61$ |
| $r_{13} = -0.1933$ | | |
| $F = 1$ | | $D = 0.3038$ |
| $\beta = 2.5X$ | | $(n_1 + n_2)/2 = 1.57803$ |
| $NA = 0.07$ | | $\nu_5 - \nu_6 = 49.91$ |
| $f_F = 0.337$ | | $\nu_8 - \nu_7 = 37.83$ |
| $f_B = -1.047$ | | $(\nu_1 + \nu_2)/2 = 54.36$ |
| $f = 0.878$ | | $\nu_4 - \nu_3 = 19.36$ | where, reference symbols $r_1$ through $r_{13}$ respectively represent radii of curvature of respective lens surfaces, reference symbols $d_1$ through $d_{12}$ respectively represent thicknesses of respective lenses and airspaces between respective lenses, reference symbols $n_1$ through $n_8$ respectively represent refractive indices of respective lenses, reference symbols $\nu_1$ through $\nu_8$ respectively represent Abbe's numbers of respective lenses, reference symbol $\beta$ represents the magnification, reference symbol $f_F$ represents the front focal point of the lens system as a whole, and reference symbol $f_B$ represents the rear focal point of the lens system as a whole.

9. A microscope objective according to claim 3 wherein said first lens component is arranged as a biconvex lens, said second lens component is arranged as a negative meniscus lens, said third lens component is arranged as a cemented doublet having negative refractive power, and said fourth lens component is arranged as a cemented doublet having negative refractive power.

10. A microscope objective according to claim 9 wherein said microscope objective has the following numerical data:

| | | |
|---|---|---|
| $r_1 = 0.3830$ | | |
| $d_1 = 0.0319$ | $n_1 = 1.762$ | $\nu_1 = 40.1$ |
| $r_2 = -0.4113$ | | |
| $d_2 = 0.0478$ | | |
| $r_3 = 0.1995$ | | |
| $d_3 = 0.0188$ | $n_2 = 1.51118$ | $\nu_2 = 51.02$ |
| $r_4 = 0.1192$ | | |
| $d_4 = 0.2005$ | | |
| $r_5 = 0.4993$ | | |
| $d_5 = 0.0419$ | $n_3 = 1.5927$ | $\nu_3 = 35.29$ |
| $r_6 = -0.0558$ | | |
| $d_6 = 0.0122$ | $n_4 = 1.6583$ | $\nu_4 = 57.33$ |
| $r_7 = 0.0970$ | | |
| $d_7 = 0.0319$ | | |
| $r_8 = -0.0827$ | | |
| $d_8 = 0.0646$ | $n_5 = 1.497$ | $\nu_5 = 81.61$ |
| $r_9 = -0.0672$ | | |
| $d_9 = 0.0122$ | $n_6 = 1.74$ | $\nu_6 = 31.7$ |
| $r_{10} = -0.1041$ | | |
| $d_{10} = 0.0024$ | | |
| $r_{11} = 3.1426$ | | |
| $d_{11} = 0.0146$ | $n_7 = 1.697$ | $\nu_7 = 48.51$ |
| $r_{12} = 0.4139$ | | |
| $d_{12} = 0.0476$ | $n_8 = 1.497$ | $\nu_8 = 81.61$ |
| $r_{13} = -0.1355$ | | |
| $F = 1$ | | $D = 0.3044$ |
| $\beta = 2.5X$ | | $(n_1 + n_2)/2 = 1.63659$ |
| $NA = 0.07$ | | $\nu_5 - \nu_6 = 49.91$ |
| $f_F = 0.336$ | | $\nu_8 - \nu_7 = 33.1$ |

-continued

| | | |
|---|---|---|
| $f_B = -1.044$ | | $(\nu_1 + \nu_2)/2 = 45.56$ |
| $f = 0.878$ | | $\nu_4 - \nu_3 = 22.04$ | where, reference symbols $r_1$ through $r_{13}$ respectively represent radii of curvature of respective lens surfaces, reference symbols $d_1$ through $d_{12}$ respectively represent thicknesses of respective lenses and airspaces between respective lenses, reference symbols $n_1$ through $n_8$ respectively represent refractive indices of respective lenses, reference symbols $\nu_1$ through $\nu_8$ respectively represent Abbe's numbers of respective lenses, reference symbol $\beta$ represents the magnification, reference symbol $f_F$ represents the front focal point of the lens system as a whole, and reference symbol $f_B$ represents the rear focal point of the lens system as a whole.

11. A microscope objective according to claim 3 wherein said first lens component is arranged as a positive meniscus lens, said second lens component is arranged as a biconcave lens, said third lens component is arranged as a cemented doublet having positive refractive power, and said fourth lens component is arranged as a cemented doublet having negative refractive power.

12. A microscope objective according to claim 11 wherein said microscope objective has the following numerical data:

| | | |
|---|---|---|
| $r_1 = 0.1126$ | | |
| $d_1 = 0.0330$ | $n_1 = 1.6223$ | $\nu_1 = 53.2$ |
| $r_2 = 0.6299$ | | |
| $d_2 = 0.1282$ | | |
| $r_3 = -0.0607$ | | |
| $d_3 = 0.0243$ | $n_2 = 1.61772$ | $\nu_2 = 49.83$ |
| $r_4 = 2.3358$ | | |
| $d_4 = 0.1087$ | | |
| $r_5 = 0.1468$ | | |
| $d_5 = 0.0579$ | $n_3 = 1.5927$ | $\nu_3 = 35.29$ |
| $r_6 = -0.0816$ | | |
| $d_6 = 0.0122$ | $n_4 = 1.6583$ | $\nu_4 = 57.33$ |
| $r_7 = 0.1856$ | | |
| $d_7 = 0.0298$ | | |
| $r_8 = -0.1819$ | | |
| $d_8 = 0.0476$ | $n_5 = 1.497$ | $\nu_5 = 81.61$ |
| $r_9 = -0.0777$ | | |
| $d_9 = 0.0122$ | $n_6 = 1.74$ | $\nu_6 = 31.7$ |
| $r_{10} = -0.1384$ | | |
| $d_{10} = 0.0024$ | | |
| $r_{11} = 1.3951$ | | |
| $d_{11} = 0.0146$ | $n_7 = 1.50137$ | $\nu_7 = 56.4$ |
| $r_{12} = 0.1416$ | | |
| $d_{12} = 0.0491$ | $n_8 = 1.497$ | $\nu_8 = 81.61$ |
| $r_{13} = -0.1930$ | | |
| $F = 1$ | | $D = 0.2976$ |
| $\beta = 2.5X$ | | $(n_1 + n_2)/2 = 1.62001$ |
| $NA = 0.07$ | | $\nu_5 - \nu_6 = 49.91$ |
| $f_F = 0.336$ | | $\nu_8 - \nu_7 = 25.21$ |
| $f_B = -1.047$ | | $(\nu_1 + \nu_2)/2 = 51.52$ |
| $f = 0.878$ | | $\nu_4 - \nu_3 = 22.04$ | where, reference symbols $r_1$ through $r_{13}$ respectively represent radii of curvature of respective lens surfaces, reference symbols $d_1$ through $d_{12}$ respectively represent thicknesses of respective lenses and airspaces between respective lenses, reference symbols $n_1$ through $n_8$ respectively represent refractive indices of respective lenses, reference symbols $\nu_1$ through $\nu_8$ respectively represent Abbe's numbers of respective lenses, reference symbol $\beta$ represents the magnification, reference symbol $f_F$ represents the front focal point of the lens system as a whole, and reference symbol $f_B$ represent the rear focal point of the lens system as a whole.

13. A microscope objective according to claim 3 wherein said first lens component is arranged as a positive meniscus lens, said second lens component is arranged as a negative meniscus lens, said third lens component is arranged as a cemented doublet having negative refractive power, and said fourth lens component is arranged as a cemented doublet having negative refractive power.

14. A microscope objective according to claim 13 wherein said microscope objective has the following numerical data:

| | | |
|---|---|---|
| $r_1 = 0.1044$ | | |
| $d_1 = 0.0330$ | $n_1 = 1.6223$ | $\nu_1 = 53.2$ |
| $r_2 = 0.4352$ | | |
| $d_2 = 0.1169$ | | |
| $r_3 = -0.0592$ | | |
| $d_3 = 0.0141$ | $n_2 = 1.61772$ | $\nu_2 = 49.83$ |
| $r_4 = -0.5253$ | | |
| $d_4 = 0.1336$ | | |
| $r_5 = 0.1014$ | | |
| $d_5 = 0.0394$ | $n_3 = 1.5927$ | $\nu_3 = 35.29$ |
| $r_6 = -0.0950$ | | |
| $d_6 = 0.0122$ | $n_4 = 1.713$ | $\nu_4 = 53.84$ |
| $r_7 = 0.1193$ | | |
| $d_7 = 0.0321$ | | |
| $r_8 = -0.1236$ | | |
| $d_8 = 0.0499$ | $n_5 = 1.497$ | $\nu_5 = 81.61$ |
| $r_9 = -0.0700$ | | |
| $d_9 = 0.0122$ | $n_6 = 1.74$ | $\nu_6 = 31.7$ |
| $r_{10} = -0.1166$ | | |
| $d_{10} = 0.0024$ | | |
| $r_{11} = 0.7135$ | | |
| $d_{11} = 0.0146$ | $n_7 = 1.50137$ | $\nu_7 = 56.4$ |
| $r_{12} = 0.1212$ | | |
| $d_{12} = 0.0596$ | $n_8 = 1.497$ | $\nu_8 = 81.61$ |
| $r_{13} = -0.2109$ | | |
| $F = 1$ | | $D = 0.3015$ |
| $\beta = 2.5X$ | | $(n_1 + n_2)/2 = 1.62001$ |
| $NA = 0.07$ | | $\nu_5 - \nu_6 = 49.91$ |
| $f_F = 0.337$ | | $\nu_8 - \nu_7 = 25.21$ |
| $f_B = -1.039$ | | $(\nu_1 + \nu_2)/2 = 51.52$ |
| $f = 0.878$ | | $\nu_4 - \nu_3 = 18.55$ | where, reference symbols $r_1$ through $r_{13}$ respectively represent radii of curvature of respective lens surfaces, reference symbols $d_1$ through $d_{12}$ respectively represent thicknesses of respective lenses and airspaces between respective lenses, reference symbols $n_1$ through $n_8$ respectively represent refractive indices of respective lenses, reference symbols $\nu_1$ through $\nu_8$ respectively represent Abbe's numvers of respective lenses, reference symbol $\beta$ represents the magnification, reference symbol $f_F$ represents the front focal point of the lens system as a whole, and reference symbol $f_B$ represents the rear focal point of the lens system as a whole.

15. A microscope objective according to claim 13 wherein said microscope objective has the following numerical data:

| | | |
|---|---|---|
| $r_1 = 0.1398$ | | |
| $d_1 = 0.0329$ | $n_1 = 1.755$ | $\nu_1 = 52.33$ |
| $r_2 = 0.4183$ | | |
| $d_2 = 0.1838$ | | |
| $r_3 = -0.0660$ | | |
| $d_3 = 0.0136$ | $n_2 = 1.55963$ | $\nu_2 = 61.17$ |
| $r_4 = -0.2909$ | | |
| $d_4 = 0.0515$ | | |
| $r_5 = 0.3101$ | | |
| $d_5 = 0.0374$ | $n_3 = 1.5927$ | $\nu_3 = 35.29$ |
| $r_6 = -0.0483$ | | |
| $d_6 = 0.0116$ | $n_4 = 1.55963$ | $\nu_4 = 61.17$ |
| $r_7 = 0.1410$ | | |
| $d_7 = 0.0208$ | | |
| $r_8 = -0.0984$ | | |
| $d_8 = 0.0401$ | $n_5 = 1.497$ | $\nu_5 = 81.61$ |
| $r_9 = -0.0531$ | | |
| $d_9 = 0.0116$ | $n_6 = 1.74$ | $\nu_6 = 31.7$ |
| $r_{10} = -0.0981$ | | |
| $d_{10} = 0.0023$ | | |
| $r_{11} = 6.2293$ | | |
| $d_{11} = 0.0140$ | $n_7 = 1.50048$ | $\nu_7 = 65.99$ |
| $r_{12} = 0.1040$ | | |
| $d_{12} = 0.0742$ | $n_8 = 1.497$ | $\nu_8 = 81.61$ |
| $r_{13} = -0.1397$ | | |
| $F = 1$ | | $D = 0.2974$ |
| $\beta = 2.5X$ | | $(n_1 + n_2)/2 = 1.65732$ |
| $NA = 0.07$ | | $\nu_5 - \nu_6 = 49.91$ |
| $f_F = 0.340$ | | $\nu_8 - \nu_7 = 15.62$ |
| $f_B = -1.114$ | | $(\nu_1 + \nu_2)/2 = 56.75$ |
| $f = 0.837$ | | $\nu_4 - \nu_3 = 25.88$ | where, reference symbols $r_1$ through $r_{13}$ respectively represent radii of curvature of respective lens surfaces, reference symbols $d_1$ through $d_{12}$ respectively represent thicknesses of respective lenses and airspaces between respective lenses, reference symbols $n_1$ through $n_8$ respectively represent refractive indices of respective lenses, reference symbols $\nu_1$ through $\nu_8$ respectively represent Abbe's numbers of respective lenses, reference symbol $\beta$ represents the magnification, reference symbol $f_F$ represents the front focal point of the lens system as a whole, and reference symbol $f_B$ represents the rear focal point of the lens system as a whole.

16. A microscope objective according to claim 13 wherein said microscope objective has the following numerical data:

| | | |
|---|---|---|
| $r_1 = 0.1393$ | | |
| $d_1 = 0.0329$ | $n_1 = 1.741$ | $\nu_1 = 52.68$ |
| $r_2 = 0.4461$ | | |
| $d_2 = 0.1768$ | | |
| $r_3 = -0.0699$ | | |
| $d_3 = 0.0118$ | $n_2 = 1.6583$ | $\nu_2 = 57.33$ |
| $r_4 = -0.2204$ | | |
| $d_4 = 0.0546$ | | |
| $r_5 = 0.2189$ | | |
| $d_5 = 0.0480$ | $n_3 = 1.5927$ | $\nu_3 = 35.29$ |
| $r_6 = -0.0535$ | | |
| $d_6 = 0.0116$ | $n_4 = 1.55963$ | $\nu_4 = 61.17$ |
| $r_7 = 0.1147$ | | |
| $d_7 = 0.0204$ | | |
| $r_8 = -0.0848$ | | |
| $d_8 = 0.0408$ | $n_5 = 1.497$ | $\nu_5 = 81.61$ |
| $r_9 = -0.0522$ | | |
| $d_9 = 0.0116$ | $n_6 = 1.74$ | $\nu_6 = 31.7$ |
| $r_{10} = -0.0941$ | | |
| $d_{10} = 0.0023$ | | |
| $r_{11} = 2.7517$ | | |
| $d_{11} = 0.0140$ | $n_7 = 1.50048$ | $\nu_7 = 65.99$ |
| $r_{12} = 0.1053$ | | |
| $d_{12} = 0.0717$ | $n_8 = 1.497$ | $\nu_8 = 81.61$ |
| $r_{13} = -0.1373$ | | |
| $F = 1$ | | $D = 0.2906$ |
| $\beta = 2.5X$ | | $(n_1 + n_2)/2 = 1.69965$ |
| $NA = 0.07$ | | $\nu_5 - \nu_6 = 49.91$ |
| $f_F = 0.340$ | | $\nu_8 - \nu_7 = 15.62$ |
| $f_B = -1.114$ | | $(\nu_1 + \nu_2)/2 = 55.01$ |
| $f = 0.837$ | | $\nu_4 - \nu_3 = 25.88$ | where, reference symbols $r_1$ through $r_{13}$ respectively represent radii of curvature respective lens surfaces, reference symbols $d_1$ through $d_{12}$ respectively represent thicknesses of respective lenses and airspaces between respective lenses, reference symbols $n_1$ through $n_8$ respectively represent refractive indices of respective lenses, reference symbols $\nu_1$ through $\nu_8$ respectively represent Abbe's numbers of respective lenses, reference symbol $\beta$ represents the magnification, reference symbol $f_F$ represents the front focal point of the lens system as a whole, and reference symbol $f_B$ represents the rear focal point of the lens system as a whole.

17. A microscope objective according to claim 13 wherein said microscope objective has the following numerical data:

| | | | |
|---|---|---|---|
| $r_1 = 0.1438$ | | | |
| $d_1 = 0.0327$ | $n_1 = 1.755$ | $\nu_1 = 52.33$ | |
| $r_2 = 0.4311$ | | | |
| $d_2 = 0.1791$ | | | |
| $r_3 = -0.0783$ | | | |
| $d_3 = 0.0120$ | $n_2 = 1.6968$ | $\nu_2 = 56.49$ | |
| $r_4 = -0.1877$ | | | |
| $d_4 = 0.0571$ | | | |
| $r_5 = 0.1454$ | | | |
| $d_5 = 0.0479$ | $n_3 = 1.5927$ | $\nu_3 = 35.29$ | |
| $r_6 = -0.0561$ | | | |
| $d_6 = 0.0116$ | $n_4 = 1.60311$ | $\nu_4 = 60.7$ | |
| $r_7 = 0.0862$ | | | |
| $d_7 = 0.0211$ | | | |
| $r_8 = -0.0834$ | | | |
| $d_8 = 0.0453$ | $n_5 = 1.497$ | $\nu_5 = 81.61$ | |
| $r_9 = -0.0524$ | | | |
| $d_9 = 0.0116$ | $n_6 = 1.74$ | $\nu_6 = 31.7$ | |
| $r_{10} = -0.0943$ | | | |
| $d_{10} = 0.0023$ | | | |
| $r_{11} = -2.1564$ | | | |
| $d_{11} = 0.0140$ | $n_7 = 1.50048$ | $\nu_7 = 65.99$ | |
| $r_{12} = 0.1116$ | | | |
| $d_{12} = 0.0630$ | $n_8 = 1.497$ | $\nu_8 = 81.61$ | |
| $r_{13} = -0.1211$ | | | |
| $F = 1$ | | $D = 0.2966$ | |
| $\beta = 2.5X$ | | $(n_1 + n_2)/2 = 1.7259$ | |
| $NA = 0.07$ | | $\nu_5 - \nu_6 = 49.91$ | |
| $f_F = 0.340$ | | $\nu_8 - \nu_7 = 15.62$ | |
| $f_B = -1.114$ | | $(\nu_1 + \nu_2)/2 = 54.41$ | |
| $f = 0.837$ | | $\nu_4 - \nu_3 = 25.41$ | | where, reference symbols $r_1$ through $r_{13}$ respectively represent radii of curvature of respective lens surfaces, reference symbols $d_1$ through $d_{12}$ respectively represent thicknesses of respective lenses and airspaces between respective lenses, reference symbols $n_1$ through $n_8$ respectively represent refractive indices of respective lenses, reference symbols $\nu_1$ through $\nu_8$ respectively represent Abbe's numbers of respective lenses, reference symbol $\beta$ represents the magnification, reference symbol $f_F$ represents the front focal point of the lens system as a whole, and reference symbol $f_B$ represents the rear focal point of the lens system as a whole.

* * * * *